United States Patent [19]

Menager

[11] 4,205,857
[45] Jun. 3, 1980

[54] CENTRIFUGAL PUMPS
[75] Inventor: Jean Menager, Luxembourg, Luxembourg
[73] Assignee: Societe Internationale de Mecanique Industrielle S.A., Luxembourg, Luxembourg
[21] Appl. No.: 813,310
[22] Filed: Jul. 6, 1977
[30] Foreign Application Priority Data
Jul. 6, 1976 [FR] France ............................. 76 20591
[51] Int. Cl.² ............................................. F16J 15/34
[52] U.S. Cl. .......................................... 277/38; 277/88
[58] Field of Search ................. 277/1, 9, 9.5, 10, 11, 277/38–43, 50, 8 NR, 88, 182, 183, 189, 189.5

[56] References Cited
U.S. PATENT DOCUMENTS

| 2,375,085 | 5/1945 | Curtis . |
| 3,614,272 | 10/1971 | Lightfoot . |
| 3,914,072 | 10/1975 | Rowley et al. . |

FOREIGN PATENT DOCUMENTS

| 2216815 | 11/1972 | Fed. Rep. of Germany ............ 277/43 |
| 2732658 | 7/1977 | Fed. Rep. of Germany ............ 277/38 |
| 1111634 | 5/1968 | United Kingdom . |

Primary Examiner—Robert I. Smith
Attorney, Agent, or Firm—Holman & Stern

[57] ABSTRACT

A centrifugal pump comprising a housing, a shaft rotatably mounted in a bore of the housing, a wheel fixed to a hub secured to the shaft and comprising a plurality of angularly distributed openings, a seal assembly comprising a counter-ring, a friction ring secured to a flexible member and resilient means for urging the ring into contact with the counter-ring, the counter-ring and flexible member being secured to respective connection members, of which one is fitted in a recess of the housing and comprises a radial thrust surface facing said openings of the wheel while the other is fixed to the hub and is made of elastomer material, further comprising a sleeve surrounding the shaft, said sleeve being secured to the hub at one end thereof and being provided at its other end with a radially enlarged abutment portion to retain said one connection member or the respective one of said counter-ring and said flexible member before its mounting inside said housing.

7 Claims, 10 Drawing Figures

CENTRIFUGAL PUMPS

The invention relates to centrifugal pumps, in particular to pumps for circulating the cooling agent in internal combustion engines.

The technological developments in this field have consisted in simplifying and reducing the number of components of the pump. For instance, the two ball bearings held outwardly on the shaft by a number of attachments (bushings, snap rings, etc.), have been replaced by a shaft bearing unit drive-fitted in a smooth bore of the pump housing.

In an other example, the seal which comprised a stack of separate parts (spring, elastic member, friction ring) to mount in succession in slots machined in the wheel, has been replaced by a single unit directly drive-fitted in a mere cylindrical recess provided concentrically of the shaft in the pump housing.

A conventional pump now comprises the six distinct following elements: the pump housing, the shaft bearing unit, the seal, the counter-ring, the wheel and the sealing plate. Attempts have been made to group on the one hand the seal and counter-ring and on the other hand the counter-ring and wheel. In both cases, however, the friction surfaces of the seal and counter-ring remain exposed and may be damaged or soiled during the assembling steps, which implies rejects and a poor reliability.

The object of the invention is to provide a pump in which the seal, the counter ring and the wheel form a single unit which may be fitted in the pump in a single step, whereby the pump will only comprise four components: the pump housing, the shaft bearing unit, the seal-ring-wheel assembly and the sealing plate.

There is provided according to the invention a centrifugal pump, comprising a housing, a shaft rotatably mounted in a bore of the housing, a wheel fixed to a hub secured to the shaft and comprising a plurality of angularly distributed openings, a seal assembly comprising a counter-ring, a friction ring secured to a flexible member and resilient means for urging the ring into contact with the counter-ring, the counter-ring and flexible member being secured to respective connection members, of which one is fitted in a recess of the housing and comprises a radial thrust surface facing said openings of the wheel while the other is fixed to the hub and is made of elastomer material, further comprising a sleeve surrounding the shaft, said sleeve being secured to the hub at one end thereof and being provided at its other end with a radially enlarged abutment portion to retain said said one connection member or the respective one of said counter-ring and said flexible member before its mounting inside said housing.

The sleeve keeps assembled the wheel-counter-ring-seal assembly (the seal comprising in turn the friction ring, the flexible member and the resilient means) before it is mounted in the pump and, in use, protects the shaft against corrosion.

The mounting of such as assembly is achieved in a very simple manner by means of a mandrel operable to slide on the shaft, having a plurality of projecting fingers arranged to traverse the openings in the wheel and a central annular abutment surface for drive-fitting the hub onto the shaft, whereby the compression rate of the resilient means may be determined by the axial spacing between the end faces of the fingers and the central abutment surface.

Preferably an air intake and a discharge opening are arranged radially in the housing facing the enlarged portion of said sleeve.

The invention will now be described with reference to the attached drawings, in which:

FIG. 2b is similar to FIG. 1b for the alternative of FIG. 2a.

Figure 1A:
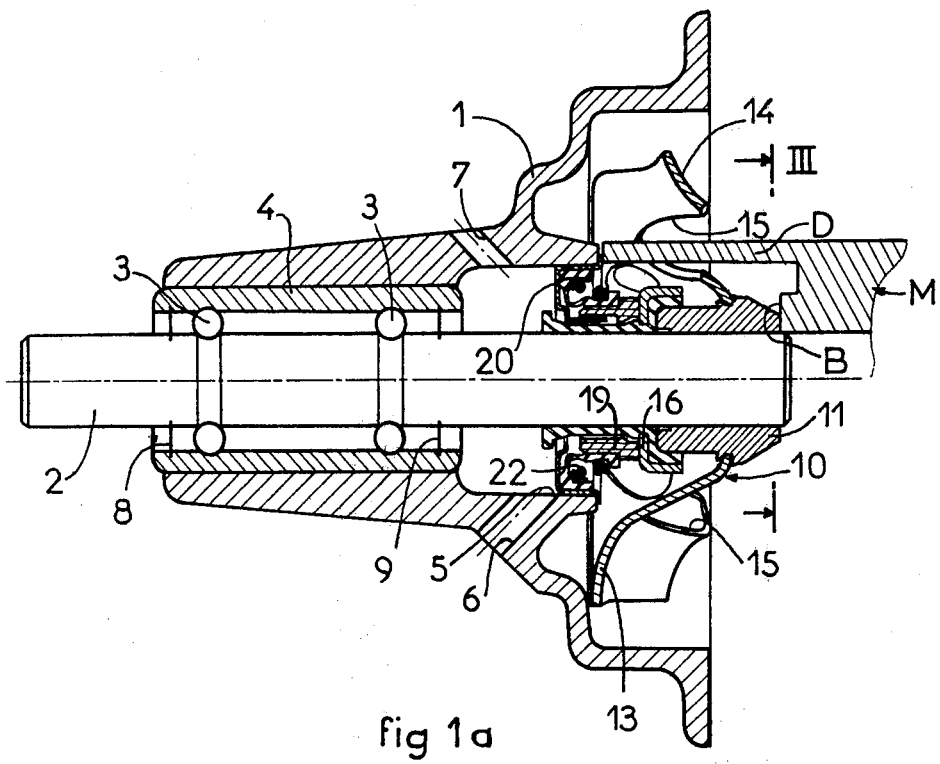
FIG. 1a is an axial section of a first embodiment of the pump according to the invention, the fitting mandrel being partially shown.

The pump shown in FIG. 1a comprises a housing 1 in which is mounted a shaft 2 supported by the two rows of balls 3 in cage 4, which is in turn drive fitted in housing 1. Two lateral seals 8, 9 are provided to prevent the grease contained in the bearings from leaking to the outside.

Of course, any system supporting the shaft while allowing a single degree of freedom in rotation could be convenient. Plain bearings or needle bearings could also be used.

The sealing plate which must be secured to housing 1 once the sealing device and the wheel have been mounted is not shown.

Figure 1B:
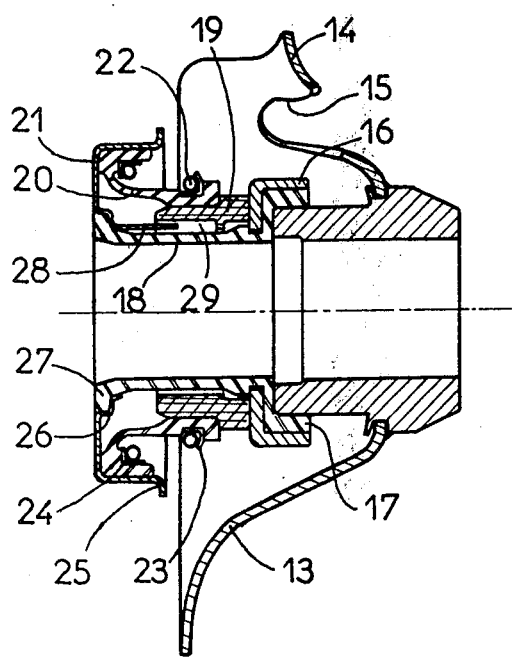
FIG. 1b is a detailed view at an enlarged scale of the wheel-seal assembly fitted on the pump of FIG. 1, but in a relaxed state.

Wheel 10 with its hub 11 and the seal unit, comprising the seal formed substantially of the friction ring 19, the flexible member 20 and the spring 22, and the counter-ring 16, form a unit shown in relaxed state in FIG. 1b.

More precisely, the wheel 10 is of the type described in French Pat. No. 1,300,199 and comprises a stamped metallic flange having projecting sectors 13 and hollowed out sectors 14 arranged in alternating manner, openings 15 being provided in the hollowed out zones both in order to improve the efficiency, as explained in the above mentioned patent, and to permit mounting the unit on the pump in the manner described hereinafter.

The wheel 10 is fixed by crimping and brazing onto hub 11 of sintered steel arranged to be drive-fitted onto the pump shaft 2, and the counter-ring 16 is secured to the hub via a shouldered portion 17 of a sleeve 18 made of elastomer material to bring about static sealing.

The sealing action results in known manner from the friction between counter ring 16 which rotates with hub 11 and the friction ring 19 fixed to the flexible member 20 which in turn is secured to a box 21 designed to be drive-fitted into the pump housing 1, as shown in FIG. 1a. The force urging the ring 19 into contact with counter-ring 16 is supplied by a frustoconical spring 22. The connection between ring 19 and flexible member 20 is provided by an outer ring 23 and the connection between the flexible member 20 and the box 21 is provided by an inner ring 24.

The box 21 has a flange 25 radially facing the openings 15 of the wheel, thus providing a thrust surface for the mounting and a shoulder 26 engaging a flare 27 of sleeve 18, when the assembly is in its relaxed state (FIG. 1b) for holding it assembled against the action of spring 22. Box 21 further comprises two extensions 28 for engagement with grooves 29 of complementary shape provided in the friction ring 19 to prevent any rotation of said ring relative to the flexible member 20.

Figure 3:
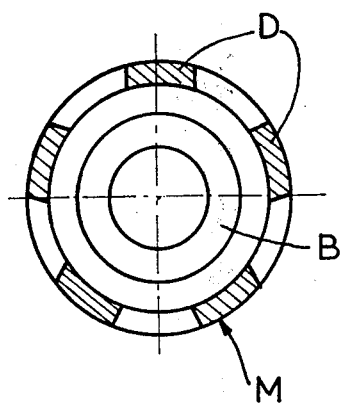
FIG. 3 is a cross-sectional view of the mandrel of FIG. 1 along line III—III of FIG. 1.

For mounting the assembly of FIG. 1b onto housing 1 and shaft 2, a mandrel M is used, shown in FIG. 3, comprising an annular abutment surface B and fingers D distributed on the outside periphery and arranged for easy penetration through the wheel openings 15. The abutment surface B drive-fits hub 11 onto shaft 2 and fingers D drive-fit box 21 in the bore 5 provided to this purpose in the pump housing. The axial spacing L between the end faces of fingers D and the abutment surface B defines in a precise manner the relative position of box 21 and counter ring 16 fixed to hub 11, and therefore the compression force which spring 22 exerts on friction ring 19. This precise adjustment is critical as a satisfactory operation of the seal assembly is dependent thereon.

Once the assembly is mounted, the flared portion 27 is disengaged since spring 22 is now compressed. flare 27 fulfils therefore the function of a rinsing and centrifugal ring for the liquid droplets which are eventually present. An opening 6 is provided in the pump housing level with flare 27 to allow discharge of the liquid, as well as an air intake 7. Moreover, it should be noted that sleeve 18 protects advantageously shaft 2 against corrosion.

Figure 2A:
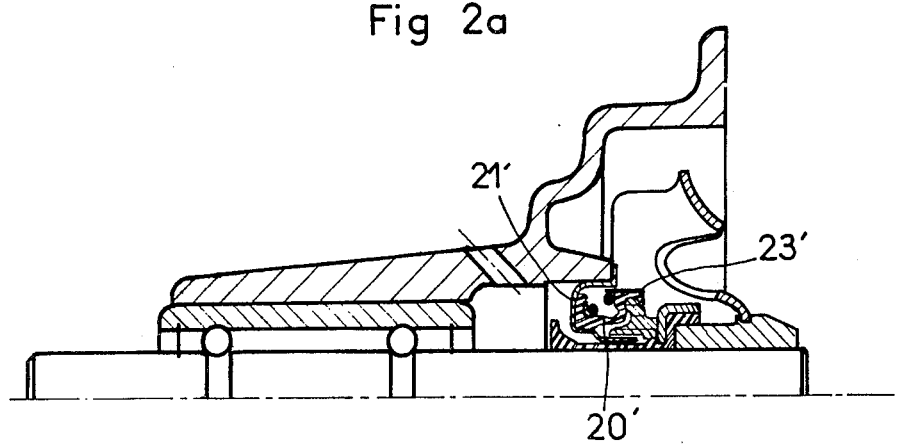
FIG. 2a is similar to FIG. 1a, but shows an alternative embodiment.
Figure 2B:
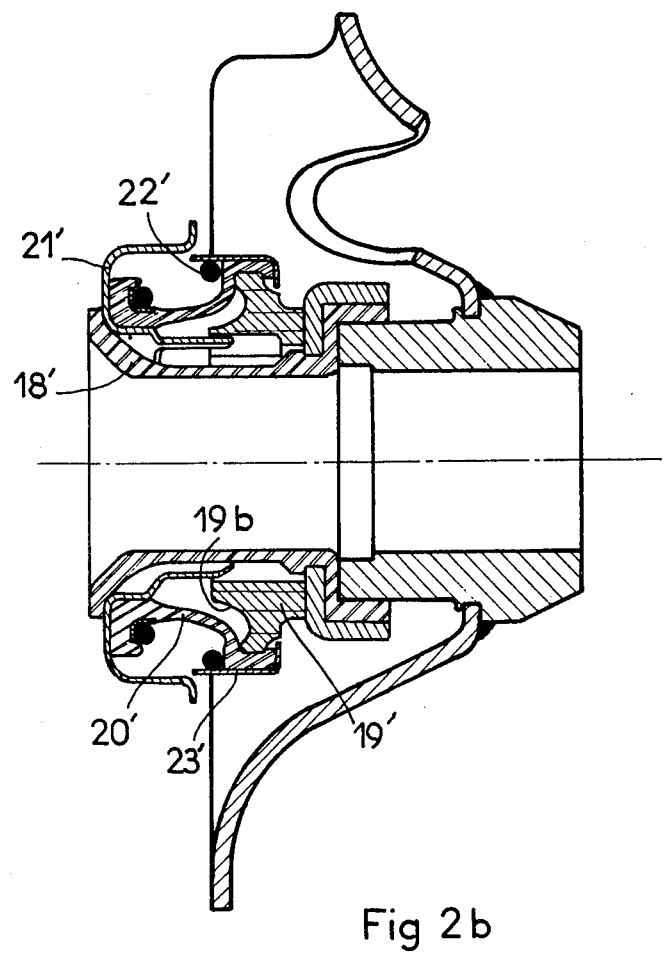

FIGS. 2a and 2b show an advantageous alternative embodiment relative to the embodiments of FIGS. 1a and 1b. The only difference lies in the structure of the seal. In this alternative embodiment, the end portion of flexible member 20' to which friction ring 19' is secured is enclosed inside a box 23', of generally cylindrical shape, and the other end portion of the flexible member is secured to the internal part of box 21' with spring 22' arranged accordingly.

Box 23' has an external diameter slightly less than the internal diameter of the external portion of box 21' to permit penetration inside box 21' during mounting as shown in FIG. 2a.

Moreover, friction ring 19' is formed on the side remote from its friction face with a recessed form 19b in which the flexible member is accomodated in use, as shown in FIG. 2a. This is only possible due to the arrangement of the flexible member, reversed relative to the embodiments of FIGS. 1a and 1b. An advantage of said alternative embodiment is that it allows a substantially greater clearance for the flexible member as compared with the embodiment of FIGS. 1a an d1b. As the presence of sleeve 18' implies a larger internal diameter of the seal, a significant clearance for the flexible member is very advantageous.

A further advantage lies in the centering of the seal which is achieved by box 23' during operation. The seal may be subjected to a transverse water flow tending to put it out of center.

Box 23', engaged inside box 21', elimiates such decentering risks during operation.

Moreover, box 23' provides protection for the flexible member, in particular regarding the ozone emitted by the fluorescent lighting tubes. An exposure to ozone of the rubber parts causes the rather quick formation of cracks in the rubber making those parts unusable. This protection provided by box 23' improves therefore the storage stability of the unit.

Figure 4:
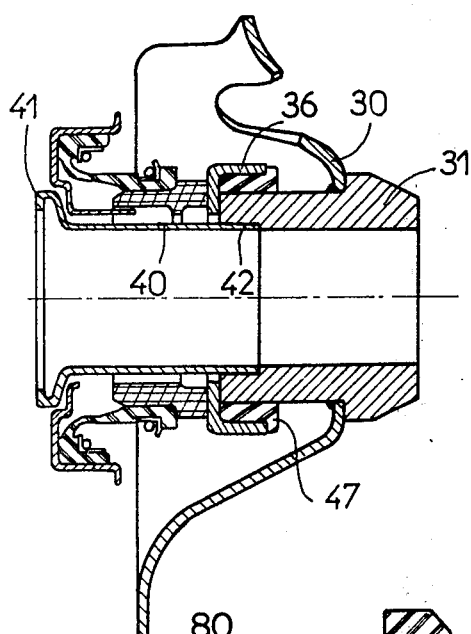
FIG. 4 is similar to FIG. 1b, but shows a third embodiment.

FIG. 4 shows a third embodiment of the unit, in which the sleeve 18 of FIGS 1a and 1b made of elastomer material is replaced by a metallic tube 40 formed with a flare 41 for centrifugation and the extremity of which 42 is drive-fitted onto hub 31. Counter-ring 36 is fixed to the hub 31 of wheel 30 via an elastomer seal 47. This arrangement provides a better radial rigidity to the unit.

Figure 5:
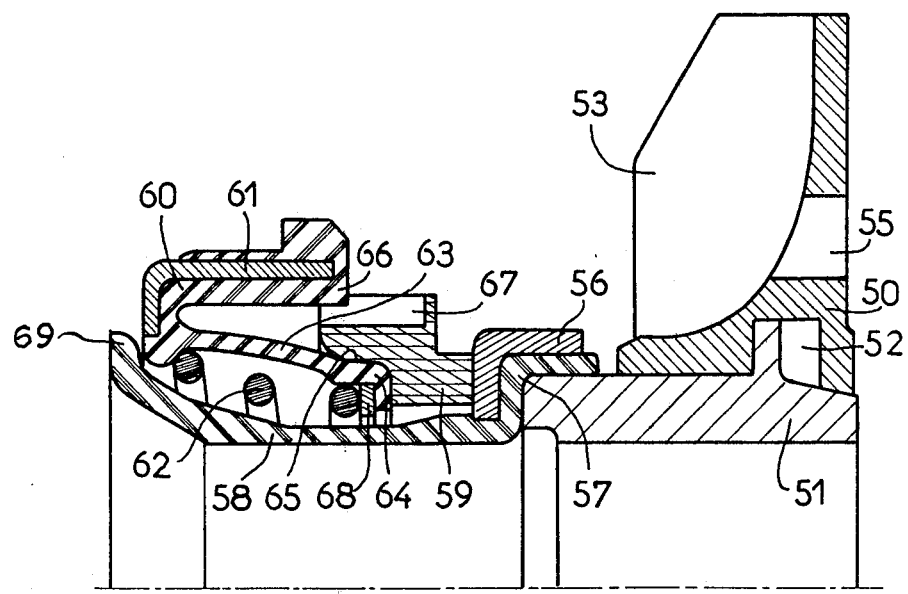
FIG. 5 is similar to FIGS. 1b and 4, but shows a fourth embodiment at an enlarged scale.

FIG. 5 shows a fourth embodiment of the wheel-seal assembly unit.

The unit comprises a wheel 50 made of an injection plastic material reinforced with glass fibres or asbestos in a proportion of 20 to 40%, molded over a metal hub 51 formed with notches 52 to ensure that the molded part is perfectly secured to the hub. The wheel 50 comprises a series of blades 53 arranged in conventional manner and between which there are formed openings 55 for the passage of fingers D of the fitting mandrel, not shown in said FIG. but identical with that of FIG. 1a.

Counter-ring 56 is fixed to hub 51 via the shouldered portion 57 of a sleeve 58 made of elastomer material. The other part of the seal assembly is made of a flexible member 60 made of elastomer material molded over a metal ring 61 and formed with an extension 63 the extremity of which 64 is shouldered and engages a bore 65 provided in friction ring 59 while being held thereon by a metal washer 68. A frustoconical spring 62 provides the axial thrust which is necessary for the sealing friction of the facing sides of counter-ring 56 and friction ring 59. Moreover, the flexible member 60 and the ring 59 are formed with respective notches 66 and 67 in engagement with each other to prevent any rotation of ring 59 relative to flexible member 60.

The upper part of flexible member 60 is disposed radially opposite the openings 55 for providing the thrust surface which is necessary to the assembling by means of mandrel M.

Moreover, sleeve 58 is formed, as in the preceding embodiments, with a flare 69 acting as a centrifugal ring and retainer against the action of spring 62.

Figure 6:
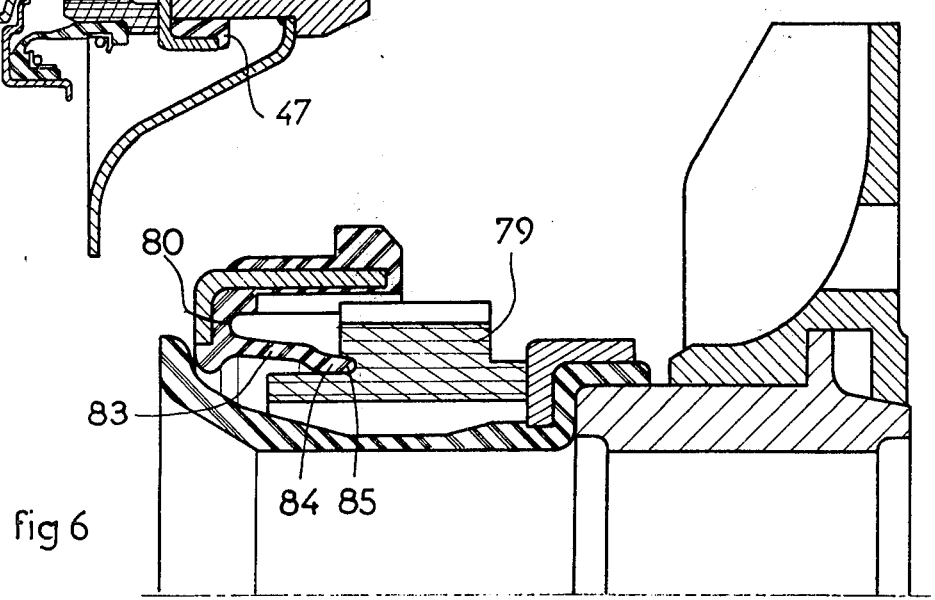
FIG. 6 is similar to FIG. 5, but shows a fifth embodiment.

The embodiment of FIG. 6 is similar to that of FIG. 5, but is simplified relative to the latter as it comprises neither spring nor retaining metal washer.

The axial thrust exerted onto friction ring 79 is provided by the extension 83 of the flexible member 80, of elastomer material, the extremity of which 84 is enclosed into a front groove 85 provided in the friction ring, the connection thus provided being reinforced when the unit is mounted in the pump.

Figure 7:
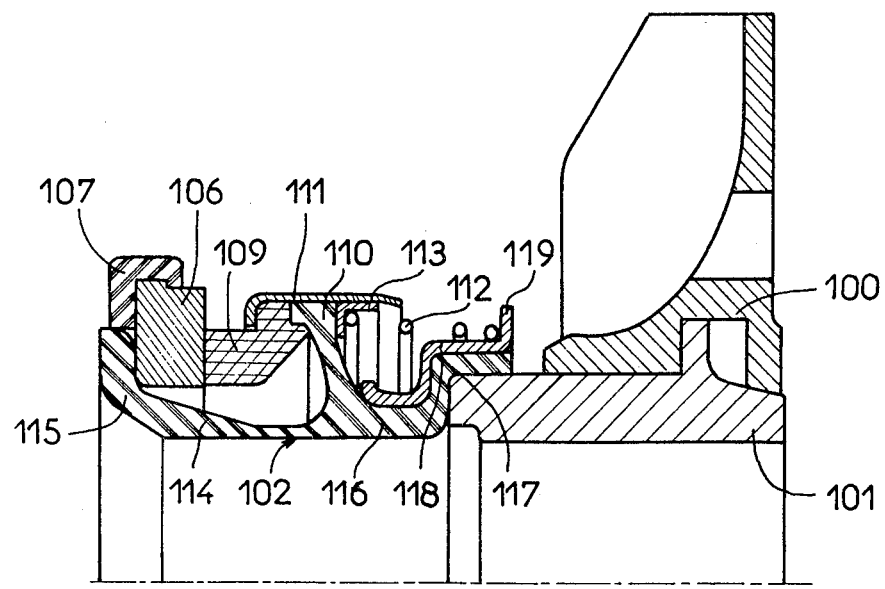
FIG. 7 is a view similar to FIGS. 5 and 6, but shows a sixth embodiment.
Figure 8:
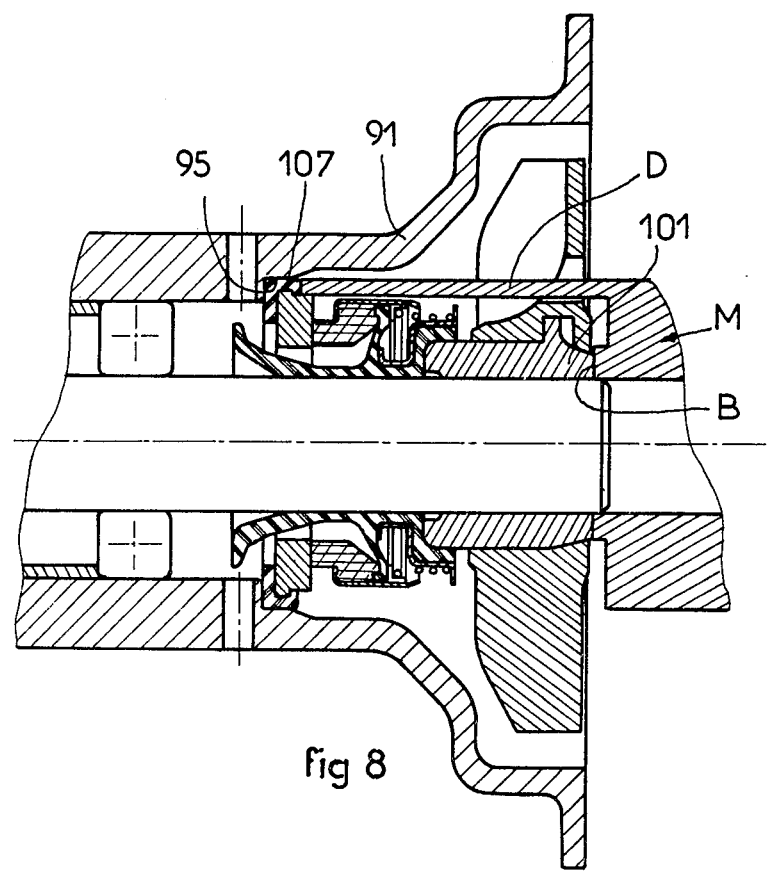
FIG. 8 is a partial view of the pump in which the assembly of FIG. 7 is mounted, the fitting mandrel being partially shown.

The embodiment of FIGS. 7 and 8 differs from the preceding ones in that the counter-ring is fixed to the housing and the rotating part is the friction ring.

Wheel 100 and hub 101 are the same as in the embodiments of FIGS. 5 and 6. The seal unit comprises the counter ring 106 surrounded by an elastomer seal 107 for providing static sealing after being drive-fitted in the corresponding recess 95 of the pump housing 91, the friction ring 109 which is crimped via a box 111 and a spacer 113 onto the outside portion 110 of an elastomer flexible member which replaces the sleeve of the preceding embodiments and is designated as a whole unit by reference 102. The elastomer member 102 has, on the other hand, a cylindrical extension 114 terminating into a flare 115, and on the other hand a cylindrical portion 116 terminating into a shouldered portion 117 which is fixed on the end of hub 101 by a ring 118 matching its shape. Moreover, ring 118 is formed with a flange 119 providing a thrust surface for spring 112 which urges friction ring 109 into contact with counter-ring 106.

The mounting is carried out as in the previous embodiments by means of mandrel M, the fingers D of which are used to drive-fit seal 107 inside recess 95 and the abutment surface B of which drive-fits hub 101 onto the pump shaft.

What I claim is:

1. A centrifugal pump comprising a housing, a shaft rotatably mounted in a bore of the housing, a wheel fixed to a hub secured to the shaft and having a plurality of angularly distributed openings, a seal assembly comprising a counter-ring, a flexible member, a friction ring secured to said flexible member and resilient means for urging the friction ring into contact with the counter-ring, the counter-ring and flexible member being secured to respective connection members, one of which connection members is fitted in a recess of the housing and comprises a radial thrust surface facing said openings of the wheel and the other of which connection members is fixed to the hub and is made of elastomer material, said assembly further comprising a sleeve surrounding the shaft, said sleeve being secured to said other connection member at one end thereof and being provided at its other end with a radially enlarged abutment portion to retain said one connection member before its mounting inside said housing.

2. A centrifugal pump according to claim 1, in which the counter ring is secured to the wheel hub and the flexible member is secured to the pump housing, the sleeve is made of an elastomer material and its end secured to the hub forms said other connection member.

3. A centrifugal pump according to claim 2, in which said one connection member is a box, having a radial wall engaging said abutment portion of the sleeve an axially extending inner wall extension and an axially extending outer wall extension, one end portion of the flexible member being fixed to said inner wall extension and bearing on said radial wall, and the other end portion of the flexible member, to which the friction ring is secured, being fixed inside a second box having an external diameter less than the internal diameter of the outer wall extension of the first mentioned box.

4. A pump according to claim 3, in which the friction ring is formed on a side remote from its friction surface with a hollowed out annular portion for receiving a portion of the flexible member.

5. A centrifugal pump according to claim 1, in which the counter-ring is secured to the housing and the flexible member is secured to the wheel hub, the flexible member is formed as an integral part with the sleeve, the end portion of said sleeve adjacent the wheel hub forming said other connection member, said other connection element being fixed to the hub by means of a rigid ring having a radial thrust surface for engagement with a spring bearing on the flexible member to urge the friction ring into contact with the counter-ring.

6. A centrifugal pump according to claim 1, in which an air intake and a discharge opening are provided radially in the housing facing the abutment portion of said sleeve.

7. An assembly for mounting in a centrifugal pump, comprising a wheel fixed to a hub and having a plurality of angularly distributed openings, a seal unit comprising a counter-ring, a flexible member, a friction ring secured to said flexible member and resilient means to urge the ring into contact with the counter-ring, the counter-ring and the flexible member being secured to respective connection members, one of which connection members is formed with a radial thrust surface facing the wheel openings while the other of said connection members is made of elastomer material and is secured to the wheel hub, and a sleeve fixed to said other connection member at one end and being formed at the other end with a radially enlarged portion to retain said one connection member before mounting in the pump.

* * * * *